Oct. 4, 1966     W. T. RENTSCHLER ETAL     3,276,342
PHOTOGRAPHIC CAMERA RELEASE AND TIME EXPOSURE DEVICE
Filed March 9, 1964     4 Sheets-Sheet 1
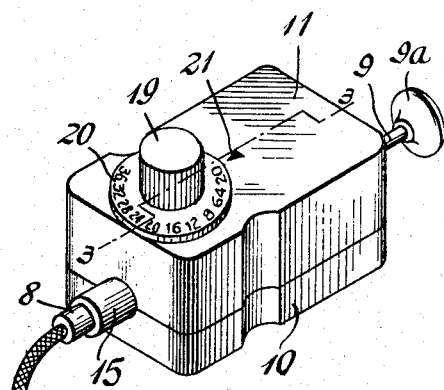
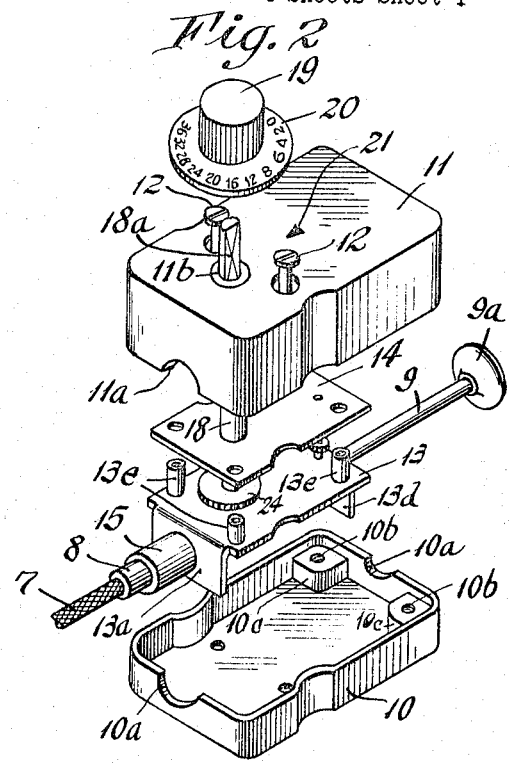
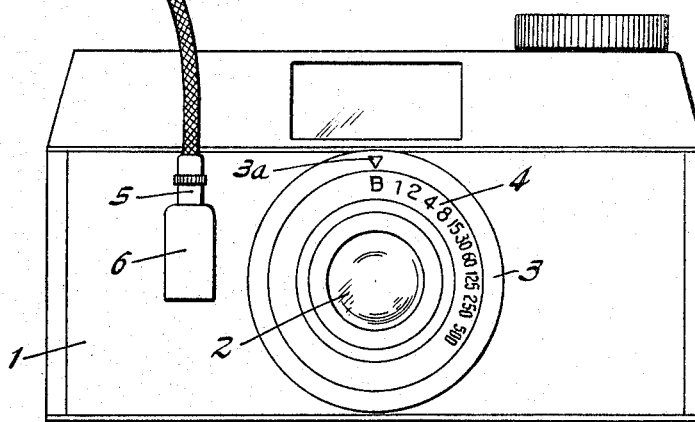
INVENTORS
Waldemar T. Rentschler
Franz W. R. Starp
Waldemar S. Racki
BY    Arthur A. March
ATTORNEY INVENTORS
Waldemar T. Rentschler
Franz W. R. Starp
Waldemar S. Racki
BY Arthur A. March
ATTORNEY

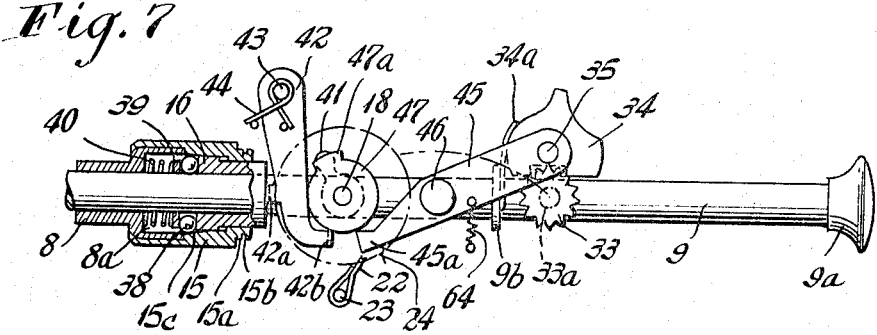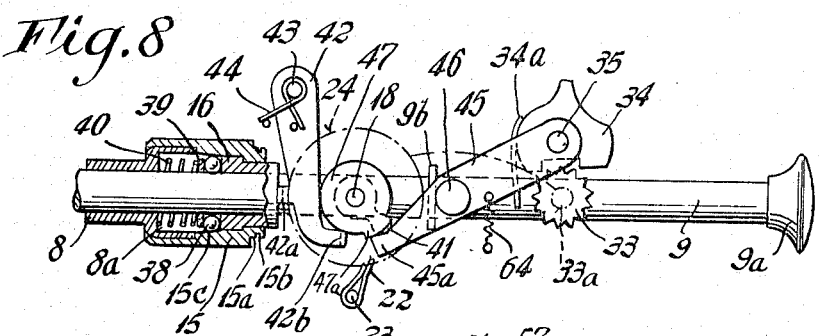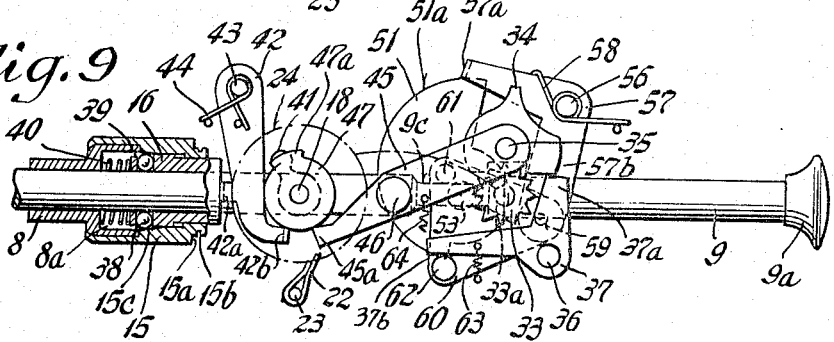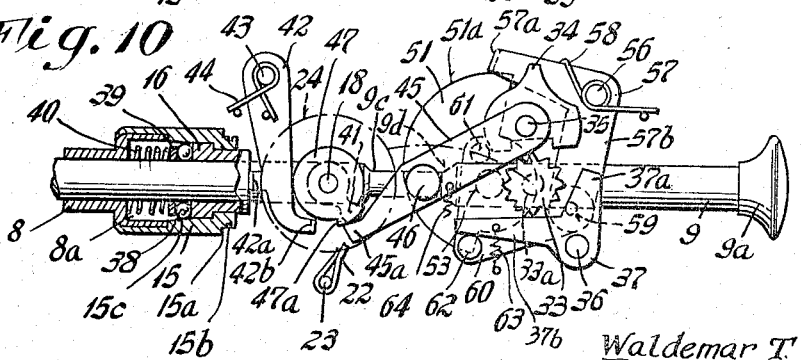

3,276,342
PHOTOGRAPHIC CAMERA RELEASE AND TIME EXPOSURE DEVICE
Waldemar T. Rentschler, Franz W. R. Starp, and Waldemar S. Racki, Calmbach (Enz), Germany, assignors to Alfred Gauthier G.m.b.H., Calmbach (Enz), Germany, a corporation of Germany
Filed Mar. 9, 1964, Ser. No. 350,414
Claims priority, application Germany, Mar. 9, 1963, G 37,246
16 Claims. (Cl. 95—53)

This invention relates in general to devices for releasing a photographic camera utilizing pusher means acting on the camera shutter, and more specifically to such a device provided with mechanism for obtaining comparatively long exposure times.

Heretofore, devices comprising pushers to act on a camera shutter employed spring powered means for actuation thereof. In such devices prior to the release of the mechanism, the spring power had either to be stored in a slide system controlled by said mechanism, or was consumed by the mechanism itself. Such devices were inherently disadvantageous in that they were dependable only when used with cameras having a release of comparatively low moment. Critical conditions occurred where the release moment of the aforesaid slide system or of the mechanism itself exceeded the release moment required for actuating the camera release member even by a very small amount. This condition especially occurred in arrangements wherein high frictional resistances necessarily resulted from the use of slide-like structural members.

An object of the present invention is to obviate the disadvantages of the afore-described known devices.

Another object is to provide by means of comparatively simple structure, a functionally dependable device for automatically obtaining long exposure times which device may be used in cameras of any type, without regard to the magnitude of the release moment that occurs or the required stroke motion of the release pin.

The foregoing objects are attained by the present invention providing means which upon manual operation of the pusher to actuate the camera shutter releases a previously cocked mechanism for running down. Furthermore, locking means are provided to maintain the pusher in release position until actuating means become operative at the end of the running-down motion of the mechanism. Thereupon, the locking means are released enabling the pusher to return to its starting position. The present device enables the photographer to initiate the release process by manually actuating the pusher, whereby the camera shutter, set at "B" position is released, and the previously cocked mechanism of the device is at the same time released for running down. Accordingly, the running-down mechanism serves to control the actuating device which releases the pusher previously retained in the release position by the locking device to thereupon terminate the exposure previously initiated by manual operation. As the release of the camera shutter with the device of the present invention is effected by the photographer himself, it is immaterial whether the camera used in connection therewith requires a large or small release moment.

A feature of this invention resides in the provision of structure which eliminates the necessity for using spring power for actuation and nevertheless saves both space and parts.

The device of the instant invention exemplarily comprises a pusher means provided with a lug or shoulder for preventing the running-down of the mechanism when the pusher means is in its starting position. Associated with the pusher is a locking device, as for example a ball catch means which acts directly on the pusher. The release of the ball catch is accomplished by means including an actuating device which becomes operative at the end of the running-down motion of the mechanism and thereupon either directly or indirectly operatively engages the locking device.

Flexibility and freedom of choice is further attained with the use of relatively simple structure such as the structure of the actuating device which comprises a control cam journalled in the cocking and driving shaft of the run-down mechanism. The arrangement is such when the mechanism is cocked, the control cam is moved into a position governed by the preset running time of the mechanism. At the end of its running-down motion, the control cam effects release of the ball catch or locking device by means of a fixed as well as rotatably positioned pressure lever.

The functional dependability of the device may be further enhanced by the association with the rotatably positioned pressure lever of a driving spring as well as a safety bolt for retaining said lever in cocked position. The cocked pressure lever is released by the control cam of the actuating device, with the cocking moment of the driving spring being so regulated that the free end of the lever, after being released, impinges suddenly with a shock-like impact on the ball catch holding the release pusher to thereby release the ball catch.

In devices in which the rotatably positioned pressure lever has no driving spring of its own but is instead actuated by the force of the mechanism, it is advantageous, in order to release the pusher suddenly and dependably, to provide another device functionally synchronized with the actuating device to disconnect gear members of the running-down mechanism. For example the escapement anchor of the mechanism may be disconnected near the end of the running-down of the mechanism and immediately before the release of the ball catch or locking device.

The device for disconnecting the escapement anchor comprises a cam disc which is fixedly connected to the cocking and driving shaft of the mechanism. The cam disc is engaged by a rotatably as well as fixedly positioned lever, one end of which carries the escapement anchor of the mechanism.

In accordance with the present invention the device may be used with all cameras and for this purpose it is provided with an adjusting means by which the moment at which the mechanism is released may be synchronized with the release moment of the camera shutter. A comparatively simple arrangement permits the release moment of the mechanism to coincide with the release moment of the camera shutter. The adjusting device essentially comprises a manually settable cam disc as well as a fixedly and rotatably positioned angle or bell crank lever which senses the control surface of the disc. A second lever cooperating with a conical lug of the release pusher is articulately arranged with said bell crank lever. The second lever is operatively connected with an arresting lever that retains the running mechanism in cocked position.

To facilitate the setting of the adjusting device, the cam disc is connected to an exteriorly accessible setting means as, for example, an adjusting button provided with a tool receiving slit for adjustment purposes. To adapt the locking device maintaining the running mechanism in cocked position to various requirements, a rotatable eccentric pin is provided which is associated with the lever cooperating with the conical lug or shoulder on the release pusher. The arresting lever of the running mechanism engages said eccentric pin under the influence of a spring.

A simple and rapid operation of the device is accomplished by the provision of an actuating knob mounted on the end of the cocking and driving shaft. Accordingly, the actuating knob can be set with respect to a running-time scale. A friction coupling provides the rotatable operative connection between the cocking and driving shaft and the driving wheel of the mechanism rotatably positioned on the shaft. A subsequent change of the running-time setting of the device is thereby permitted after the actual cocking process.

Another feature of the invention resides in the structure wherein the gear members of the mechanism and the means for releasing the ball catch and for disconnecting the escapement anchor are arranged on a bearing plate which can be connected to a sleeve receiving the release pusher. This provision is particularly important from the production and fabrication viewpoint, since it substantially facilitates the mounting of the device according to the present invention.

An attractive and enclosed appearance as well as protection against external influences may be obtained by encasing the bearing plate and the component parts of the device between two releasably interconnected complementary housing cups or shells which also serve as finger-pieces.

Other features and advantages of the invention will become apparent from the following specification taken in conjunction with the accompanying drawings which illustrate several embodiments of the invention, and in which:

FIG. 1 shows a perspective overall view of the device in connection with a photographic camera;

FIG. 2 shows an exploded perspective view of the device;

FIG. 7 is a partial plan view of the device in an embodiment which is provided with an additional device for disconnecting the escapement anchor with the running mechanism in cocked position;

FIG. 8 is a view similar to FIG. 7 with the release pusher being blocked in the release position and the running mechanism having been released for running-down;

FIG. 9 is a partial plan view of the embodiment of the device illustrated in FIGS. 7 and 8, and showing an additional device for synchronizing the release moment of the device to the release moment of the camera shutter to be released with the running mechanism in cocked position;

FIG. 10 is a view similar to FIG. 9 with the release pusher being blocked in depressed position and the running mechanism having been released for running-down;

Figure 3:
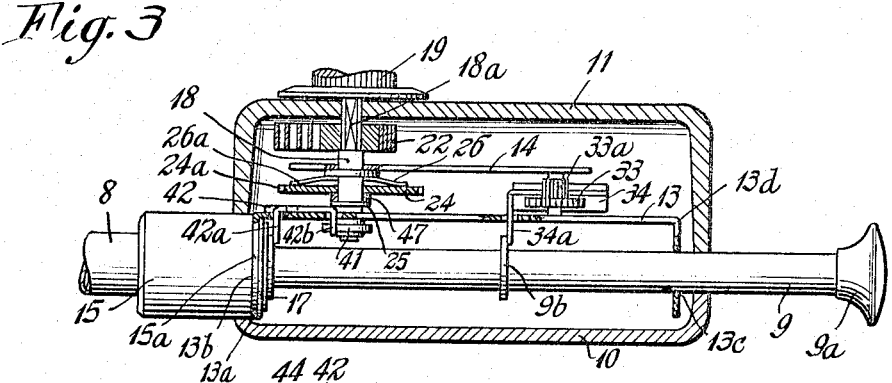
FIG. 3 is a longitudinal side sectional view through the device taken along line 3—3 indicated on FIG. 1.

Referring specifically to the drawings, FIG. 1 shows a photographic camera which is equipped with an intra-lens shutter 2. The shutter is provided with an exposure time setting ring 3 which (in turn) may be set by positioning a reference mark 3a arranged thereon to a given exposure time as indicated on a fixed scale 4. The scale 4 may comprise instantaneous exposure times, for example, of a magnitude from 1 sec. to 1/500 sec. as well as a "B" position. If the exposure time setting ring 3 is set at "B," as illustrated in FIG. 1, exposure times of unlimited duration can be obtained with the aid of the "B"-device provided in the shutter. The "B"-device of the shutter may consist essentially of an arresting lever which cooperates with the driving mechanism of the shutter, and which after the shutter release has been actuated, retains the shutter blades in their open position until the release member of the camera is again relieved from pressure.

For the most part, "B" exposures are carried out by a wire release, which is usually connected by means of a threaded nipple 5 arranged at one end thereof to a connecting piece or member 6 of the camera case 1 or the shutter 2. The nipple 5 of the release member is rotatably connected to one end of a wire or cable, "Bowden," release 7 the other end of which is connected to a sleeve 8. The sleeve 8 guides an axially displaceable pusher 9 which acts on the pressure spiral of the release member 7. One end of the pusher 9 carries a push button 9a.

As illustrated in the drawing, the release member 7 is associated with a device or accessory designed for automatically controlling ultra-long exposure times by making use of the "B" mechanism of the camera shutter. The device or accessory comprises a housing shaped so as to be easily held by the user. The housing consists of two complementary cups or shells 10 and 11 which are releasably connected to each other by two suitable fasteners or screws 12. The ends of the respective shells 10 and 11 are provided with complementary openings 10a and 11a adapted to receive the sleeve 8 at one end and the pusher 9 of the release member at the other end thereof.

Disposed within the housing are a pair of spaced parallel plates 13 and 14 which support therebetween the gear members of a running mechanism which is hereinafter described in detail.

As shown in FIG. 2, the bearing plate 13 is spaced from the second bearing plate 14 by means of spacers 13e. Screws (not shown) are used to secure the plates together and two of said screws also function to connect the two bearing plates 13 and 14 to the cup 10. These two screws are guided through the distance bushers or spacers and extend therethrough for screwing into the threaded bores 10b of the cup 10.

The bearing plate 13 is provided with a right-angled bent portion 13a at one end which, as shown in FIG. 3, is provided with a bore 13b for receiving a cylindrical bearing lug or shoulder 15a. The bearing lug is carried in a cap 15 which is pressed onto the sleeve 8 of the release member, which axially displaceably guides the sleeve 16 of a ball catch means, hereinafter described in detail. A spring lock ring 17, inserted into a annular groove 15b of the bearing lug 15a, secures the bearing plate 13 in an axial direction. The bearing plate 13 is additionally held in position within the housing by bent portion 13d which is provided with an opening 13c to receive the pusher 9, and which is arranged between the two extensions 10c of the cup 10.

The running-down mechanism of the device is arranged between the two bearing plates 13 and 14 and comprises a cocking and driving shaft 18. At its free end, the shaft 18 is provided with a flat portion 18a which is guided outwardly through a bore 11b formed in the upper cup 11. An actuating knob 19 is fitted on the flat 18a of the shaft 18 and is used to cock the mechanism as well as to set the device for the desired running time. For this purpose, the actuating knob 19 has a circular flange provided with an imprinted scale 20 constituting a plurality of setting values cooperating with the fixed setting mark 21 imprinted on the upper cup 11.

Figure 4:
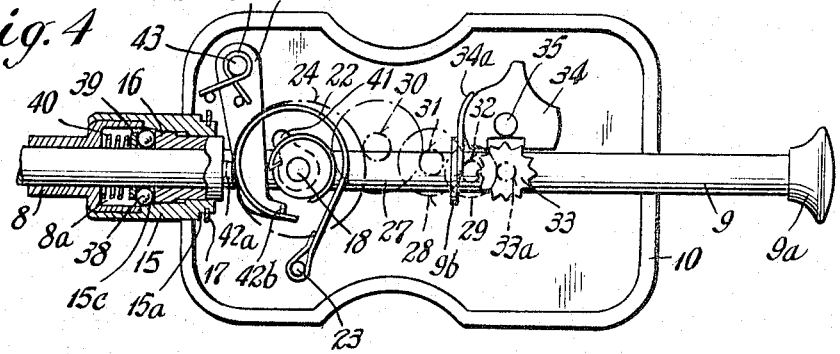
FIG. 4 shows the interior plan view of the device with the top portion of the housing removed and the running mechanism shown in cocked position.
Figure 5:
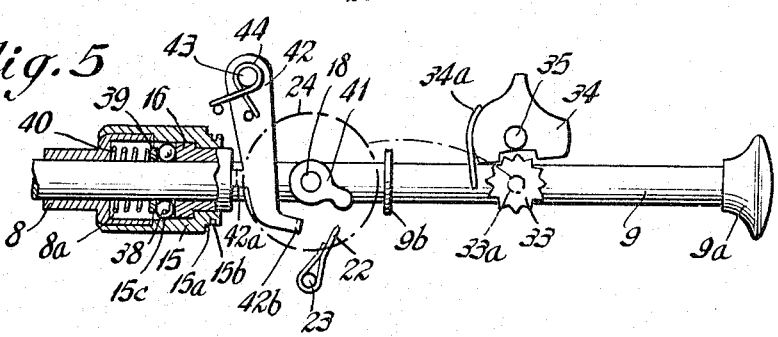
FIG. 5 is a partial plan view of the device with the release pusher being blocked in the depressed position and the running mechanism having been released for running-down.
Figure 6:
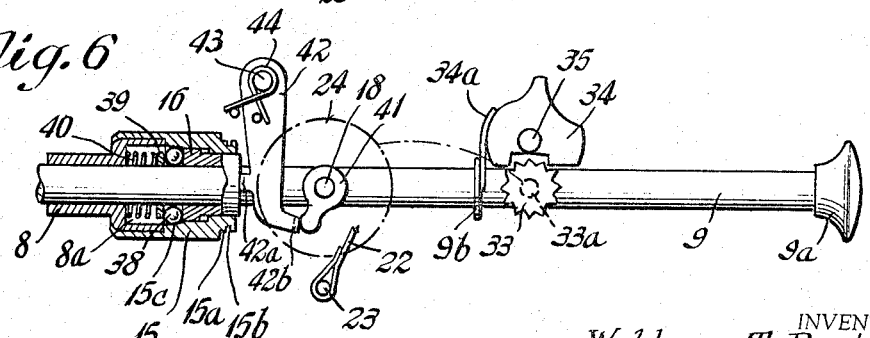
FIG. 6 is a view similar to FIG. 5 taken at the end of the running-down motion of the running mechanism with the release pusher returned to the starting position and the running mechanism locked.

As shown in FIGS. 3 and 4, the cocking and driving shaft 18 is under the influence of a helical spring 22 which drives the mechanism. The spring 22 is suspended from the shaft 18 at one end and from a fixed pin 23 at the other end. A driving wheel 24 for the mechanism is freely rotatably disposed on the cocking and driving shaft 18 and is axially secured thereto by means of a spring or lock ring 25. Fixedly journalled to the driving and cocking shaft 18 is a spring disc 26 which is constructed, for example, in the form of a four-winged or four-leaved disc. The arrangement of the spring disc 26 provides a friction coupling and is such that the wings 26a rest with a certain prestress on the driving wheel 24.

As diagrammatically illustrated in FIG. 4 the teeth 24a of the driving wheel or gear 24 engage a gear train 27, 28, 29 and pinions 30, 31 and 32, whose bearing pins are held by the plates 13 and 14. Gear 29 meshes with a pinion 33a which, in turn, is fixedly attached to an escapement or ratchet wheel 33. An escapement anchor 34 cooperates, in a known manner, with the escapement or ratchet wheel 33 with the anchor 34 being pivotable about the axis 35.

To maintain the aforedescribed running mechanism in cocked position, an arresting or locking device is provided. The locking device, which is controlled by the pusher 9 of the release member 7, prevents the escapement anchor 34 of the running mechanism from pivoting or swinging out. As illustrated in FIGS. 3 to 8, said locking device comprises a lug or shoulder 9b provided on the pusher 9 and which, in the normal or starting position of the pusher, engages the arm 34a of the escapement anchor 34.

Figure 11:
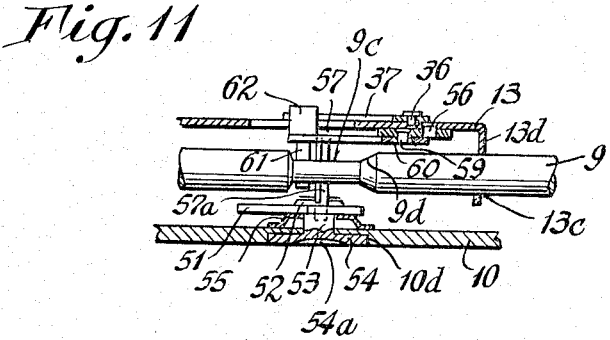
FIG. 11 is a partial side view of the device illustrating the arrangement of the individual structural members of the device for synchronizing the release moments of the device and of the camera shutter.

In the embodiment shown in FIGS. 9 to 11, the locking device comprises an angle or bell crank lever 37 disposed about a fixed axle 36 on the plate 13. An arm 37a engages the escapement anchor 34 and prevents it from pivoting or swinging out when the pusher 9 is in its starting position.

After the camera shutter and the running mechanism 18, 19 and 22 to 34 have been released, the pusher 9 is retained in depressed or released position by locking means, as for example a ball catch which is releasable by the running mechanism. For this purpose the ball catch is housed in a bore or hollow 8a of the sleeve 8 which guides the pusher 9. The particular locking means shown comprise balls 38 positioned between the pusher 9 of the release member 7 and the conical inner wall 15c of the cap 15. A pressure plate 39, under the influence of coil spring 40, is displaceably guided on the pusher 9. As a consequence the pressure plate 39 presses the balls 38 against the displaceable sleeve 16. In the operation of the ball catch locking means, the balls 38 allow the pusher 9 to be depressed. However, due to the wedging of the balls in the conical or tapered seat 15c of the capsule 15 the return of the pusher 9 to its starting position is prevented until pressure or force is again exerted on the sleeve 16 to thereby counteract the clamping effect.

In the above-described device, the sleeve 16 is displaced by means of an actuating device which is controlled by the running mechanism and comprises a control cam 41 fixed to and axially secured on the cocking and driving disc 18. At the end of the running-down motion of the running mechanism the control cam 41 causes a pressure lever 42 cooperatively associated with the displaceable sleeve 16 to become operative. As shown in FIGS. 3 to 10, the pressure lever 42 is rotatably positioned on an axle or shaft 43 firmly connected to the plate 13 and, by means of a bent lug 42a thereon, engages the displaceable sleeve 16 of the ball catch. A comparatively weak spring 44 urges the lug 42a of lever 42 against the displaceable sleeve 16 of the ball catch. The free bent end 42b of the pressure lever 42 is located in the path of motion of the cam 41. At the end of the running-down motion of the running mechanism, the cam 41 strikes the pressure lever 42 and drives this lever in a clockwise direction about its pivot or axle 43 whereupon the sleeve 16 of the ball catch is moved inwardly. The pusher 9 is then freed and enabled to return to its starting position under the influence of a spring. Thereby the "B" locking device of the shutter becomes inoperative.

Figure 12:
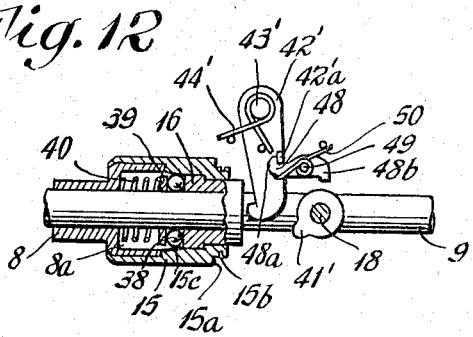
FIG. 12 is a modified form of the actuating device cooperating with the ball catch of the device and illustrated in locked position.
Figure 13:
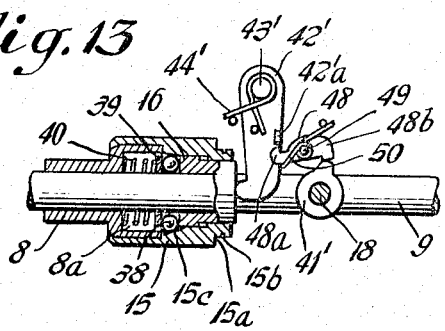
FIG. 13 shows the actuating device of FIG. 12 after release by the control cam.

In order to obtain a very sudden or shock-like impact and, as a consequence, a more positive and dependable release of the blocked pusher 9, means are provided to discontinue the escapement anchor of the running mechanism shortly before the cam 41 strikes the pressure lever 42. To accomplish this result, the escapement anchor 34 of the running-down mechanism is arranged on a two-armed carrier lever 45 which is rotatably mounted about an axle or shaft 46 on the plate 13. Cooperating with said carrier lever 45 is a cam disc 47 which is fixedly journalled to the cocking and driving shaft 18 and engages one end 45a of the lever 45 under the influence of spring 64. As seen in FIGS. 7 to 10, upon the running down of the running mechanism, the cam 47a of said disc 47 runs slightly ahead of cam 41. Therefore, the carrier lever 45 swings out in a counterclockwise direction about pivot 46 to disengage the escapement anchor 34 from the escapement wheel 33 prior to the time that the cam 41 operates to release the ball catch 15, 16. With the foregoing construction, at the end of the running-down motion of the running mechanism, an effective increase of the running-down speed is accomplished to thereby bring about a sudden actuation of the pressure lever 42 acting upon the ball catch. It will be understood that the ball catch which maintains the pusher 9 in the depressed position is released by the utilization of the energy inherent in the driving spring 22 of the running mechanism. Alternatively, the ball catch may be released by the use of a special power-storing device, as illustrated, for example, in FIGS. 12 and 13. As shown, a coil spring 44', disposed about the bearing axle 43', is associated with the pressure lever 42' cooperating with the displaceable sleeve 16 of the ball catch. The coil spring 44' influences the lever for rotation in a clockwise direction and is so constructed that after the pressure lever 42' has been released, it causes the axial displacement of the sleeve 16 against the action of the spring 40 whereby the ball catch is released. The cocking of the spring 44' can be effected jointly with the cocking of the driving spring 22 of the running mechanism, viz by means of an appropriate connection (not shown) between the pressure lever 42' and the cocking shaft 18.

The pressure lever 42' is held in cocked position by a two-armed arresting bolt 48 which is rotatably mounted on a pivot pin 49. The arm 48a of the arresting bolt 48, under the influence of a spring 50, operatively engages a bent lug 42a' of the pressure lever 42' and retains the same in cocked position (see FIG. 12). The other arm 48b of the arresting bolt 48 is located in the path of motion of the control cam 41' which is journalled on the cocking and driving shaft 18. When the control cam 41' moves it engages the arresting bolt 48 at the end of the running down of the running mechanism causing the arresting bolt to become disengaged from and release the pressure lever 42' (see FIG. 13).

FIGS. 9 to 11 illustrate the above described apparatus equipped with an adjusting device to enable the same to be used on any camera without in any way disturbing its function. The adjusting device permits the release moment of the running mechanism to be changed, i.e. it enables the synchronization of the device to the release moment of the camera shutter and that of the running mechanism upon depression of the pusher 9.

The adjusting device comprises a cam disc 51 affixed by means of a screw or the like 52 to a shaft 53 which is rotatably guided on the lower shell 10. The free end of the shaft 53 carries an exteriorly accessible adjusting button or knob 54 located in a recess 10d of the cup 10. The adjusting button 54 may be set by means of any flat object which fits into the slit 54a of the button, as for example, a coin, screwdriver, or any similar tool. In order to secure the adjusting button 54 in its respective setting position, as for example, a position marked by a line or graduated scale, it may be associated with a frictional safety catch or locking device formed substantially of a spring or resilient disc 55 arranged between the cam disc 51 and the bottom of the cup 10.

An angle or bell crank lever 57 is arranged on a pin 56 on the lower side of the plate 13. The bent arm 57a of said angle lever engages the control face 51a of the cam disc 51 under the influence of a spring 58. The other arm 57b of the angle lever 57 carries a pin or pivot 59 on which a lever 60 is rotatably mounted. Lever 60 is provided with a downwardly extending pin 61 which senses the conical lug or shoulder 9d provided on the pusher 9 and is connected to follow the groove 9c. Another pin 62, preferably constructed in the form of a rotatable eccentric pin, is fixed on the lever 60 and is adapted to drive the arresting lever 37. The arresting lever 37 cooperates with the escapement anchor 34 and rests with its arm 37b on the pin 62 under the influence of a spring 63.

Referring to the accompanying drawings the operation of the above-described device is as follows:

Rotation of the actuating knob 19 of the device moves the running mechanism 18, 19 and 22 to 34 into cocked position and places the helical spring 22 under increased stress. During this motion the gear members of the running mechanism remain inoperative or at rest, since, in the starting position of the pusher 9, the lug or shoulder 9b or the arresting lever 37 which engages the escapement anchor 34, locks the escapement wheel 33, while the wings 26a of the spring disc 26 slide off on the driving wheel 24 of the blocked mechanism. The cocking process is terminated when the numerical value on the running-time scale 20 which coincides with the desired exposure time, is placed opposite the fixed mark 21.

As illustrated in FIG. 1 of the drawing, with the above-described device connected to a camera set at "B" position, the photographer who desires to take a photograph with a so-called ultra-long exposure time merely has to depress the pusher or push rod 9, thereby releasing the camera shutter 2 for running down which in turn is retained by the "B" locking device after the shutter blades have reached their open position. At the same time, the displacement of the pusher 9 causes the lug or shoulder 9b or the arresting lever 37 to be moved away from the escapement anchor, thereby releasing the running mechanism for running down, while the pusher 9 is retained in the depressed position by the above-described ball catch.

As shown in FIGS. 3 to 6, in response to the running time preset by the actuating knob 19, the cam 41 impinges on the pressure lever 42 at the end of the running-down motion of the mechanism and rotates the pressure lever about its axis to effect release of the ball catch which had heretofore retained the pusher 9 in the depressed position. Upon release of the ball lock, the pusher 9 is returned to its initial starting position under the influence of a spring acting on said pusher. Accordingly, the "B" locking device of the camera shutter 2 is released and the shutter blades returned to their closing position.

In the form illustrated in FIGS. 7 to 10, the method of operation is similar to that above-described except that shortly before the termination of the running-down motion of the running mechanism, the escapement anchor 34 disposed on the carrier lever 45 is lifted off the escapement or ratchet wheel 33 by the cam disc 47 whereby the kinetic energy of the control cam 41 is increased.

The release moment of the accessory may be easily adapted to the release moment of any camera in that the adjusting button or knob 54 can be set accordingly, for example as aforesaid, simply with the use of a coin. In such case, the rotary motion of the adjusting button 54 is transmitted via the cam disc 51 to the angle or bell crank lever 57. The lever 60 which is articulately arranged on said angle lever 57 is thereby displaced axially in relation to the pusher 9. The pin 61 of the lever 60 therefore changes its relative position with respect to the conical lug or shoulder 9d cooperating therewith so that, upon depression of pusher 9, the release of the camera shutter is synchronized with the release of the running mechanism.

Variations and modifications may be made without departing from the spirit of the invention or the scope of the appended claims.

We claim:
1. An apparatus adapted for releasing the shutter driving mechanism of a photographic camera shutter to obtain long exposure times when the camera shutter is set at a B-position comprising
   (a) a manually cockable spring driven running mechanism adapted for setting to different running times,
   (b) a manually operated pusher means provided for releasing the camera shutter operatively associated with said running mechanism, said pusher means being adapted to act directly on the camera shutter driving mechanism,
   (c) means rendered operative for releasing said mechanism for running down when said pusher means is actuated to release the camera shutter,
   (d) locking means for locking said pusher means in its released position during the running down of said mechanism,
   (e) and actuating means for effecting the release of said pusher means at the end of the running down motion of said mechanism for effecting the return of said pusher means to its initial starting position.
2. The invention as defined in claim 1 wherein said means for releasing said mechanism for running down when said pusher means is actuated comprises
   (a) a lug for arresting the running mechanism in the inoperative position of said pusher means.
3. The invention as defined in claim 1 wherein said pusher locking means comprises
   (a) a ball catch adapted to retain said pusher means in its depressed position during the running down of said mechanism.
4. An accessory for releasing a photographic camera shutter to obtain long exposure times when the camera shutter is set at a B-position comprising
   (a) a manually cockable spring driven running mechanism adapted for setting to different running times,
   (b) a pusher means provided for releasing the camera shutter operatively associated with said running mechanism,
   (c) means rendered operative for releasing said mechanism for running down when said pusher means is actuated to release the camera shutter,
   (d) locking means for locking said pusher means in its released position during the running down of said mechanism,
   (e) and actuating means for effecting the release of said pusher means at the end of the running down motion of said mechanism for effecting the return of said pusher means to its initial starting position, wherein said actuating means includes
      (a) a cocking means for said mechanism,
      (b) a pressure lever engageable with said locking means,
      (c) a control cam fixed to said cocking means which is moved into a cocking end position dependent upon the presetting of said running mechanism and which upon completion of said running down time effects release of said locking means by said cam engaging said pressure lever.
5. The invention as defined in claim 4 and including
   (a) a driving spring operatively associated on said pressure lever,
   (b) a safety bolt for retaining said pressure lever in a cocked position, and
   (c) said control cam means operating on said safety bolt to effect release of said pressure lever, whereby the cocking moment of said driving spring being so proportioned that the free end of the pressure lever after being released, impinges suddenly with a shock-like impact on said locking means to thereby release it.

6. The invention as defined in claim 4 and including
 (a) a means to impart an impact to said locking means to assure a positive release of said locking means.

7. The invention as defined in claim 6 wherein said latter means includes
 (a) a carrier lever pivotally mounted intermediate the ends thereof,
 (b) a cam means cooperatively associated with said carrier lever,
 (c) said mechanism including an anchor escapement member carried by said lever,
 (d) said cam means leading said control cam on the running down of said mechanism whereby the cam means effects operation of said carrier lever to effect disengagement of the escapement member prior to the release of said locking means.

8. The invention as defined in claim 6 and including
 (a) a cam disk journaled to said cocking means,
 (b) a carrier lever pivoted intermediate the ends thereof operatively associated with said cam disk,
 (c) a spring means biasing said lever,
 (d) and said mechanism including an escapement anchor member carried on said lever.

9. The invention as defined in claim 1 and including
 (a) adjusting means whereby the moment of releasing of said mechanism can be adjusted to the release moment of the camera shutter.

10. The invention as defined in claim 9 wherein said adjusting means comprises
 (a) a manually settable cam having a control surface,
 (b) a first lever for sensing the control surface of said cam,
 (c) a second lever pivotally arranged on said first lever and cooperating with a shoulder formed on said pusher means, and
 (d) said second lever being operatively associated with the arresting means retaining said mechanism in its cocked position.

11. The invention as defined in claim 10 and including
 (a) a setting device fixed to said settable cam whereby said cam can be adjusted from the outside of said accessory.

12. The invention as defined in claim 10 and including
 (a) a rotatable eccentric pin associated with said second lever, said pin cooperating with the shoulder on said pusher means,
 (b) and a spring means biasing said arresting means in engagement with said pin.

13. The invention as defined in claim 1 wherein said mechanism comprises
 (a) a cocking and driving shaft,
 (b) an operating knob connected to the free end thereof,
 (c) and a scale means on said knob for setting the running time of said mechanism.

14. An accessory for releasing a photographic camera shutter to obtain long exposure times when the camera shutter is set at a B-position comprising,
 (a) a manually cockable spring driven running mechanism adapted for setting to different running times,
 (b) a manually operated pusher means provided for releasing the camera shutter operatively associated with said running mechanism, said pusher means being adapted to act directly on the camera shutter,
 (c) means rendered operative for releasing said mechanism for running down when said pusher means is actuated to release the camera shutter,
 (d) locking means for locking said pusher means in its released position during the running down of said mechanism,
 (e) and actuating means for effecting the release of said pusher means at the end of the running down motion of said mechanism for effecting the return of said pusher means to its initial starting position wherein said mechanism comprises
   (a) a cocking and driving shaft,
   (b) a driving wheel, rotatably positioned on said shaft,
   (c) and a friction coupling drivingly connecting said wheel to said shaft.

15. An accessory for releasing a photographic camera shutter to obtain long exposure times when the camera shutter is set at a B-position comprising,
 (a) a manually cockable spring driven running mechanism adapted for setting to different running times,
 (b) a manually operated pusher means provided for releasing the camera shutter operatively associated with said running mechanism, said pusher means being adapted to act directly on the camera shutter,
 (c) means rendered operative for releasing said mechanism for running down when said pusher means is actuated to release the camera shutter,
 (d) locking means for locking said pusher means in its released position during the running down of said mechanism,
 (e) and actuating means for effecting the release of said pusher means at the end of the running down motion of said mechanism for effecting the return of said pusher means to its initial starting position comprising
   (a) a bearing plate whereby said mechanism, actuating means for releasing the locking means, and means for disconnecting the escapement anchor are supported thereon,
   (b) and said plate being connected to said pusher means.

16. The invention as defined in claim 15 and including two complementary releasable housing shells shaped to be held between fingers encasing said plate and components supported thereon.

References Cited by the Examiner
UNITED STATES PATENTS

| | | | |
|---|---|---|---|
| 964,318 | 7/1910 | Roesner | 95—53.6 |
| 1,523,129 | 1/1925 | Klein | 95—53.6 |

JOHN M. HORAN, *Primary Examiner.*